(12) United States Patent
Karpuszka et al.

(10) Patent No.: US 6,701,480 B1
(45) Date of Patent: Mar. 2, 2004

(54) SYSTEM AND METHOD FOR PROVIDING ERROR CHECK AND CORRECTION IN MEMORY SYSTEMS

(75) Inventors: Dave Karpuszka, Concord, OH (US); Ron Schultz, Solon, OH (US); Ken Hall, Hudson, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 09/520,780

(22) Filed: Mar. 8, 2000

(51) Int. Cl.[7] .............................................. G06F 11/10
(52) U.S. Cl. ....................................... 714/764; 714/766
(58) Field of Search ................................ 714/763, 764, 714/766

(56) References Cited

U.S. PATENT DOCUMENTS

| | | | | |
|---|---|---|---|---|
| 3,814,921 A | * | 6/1974 | Nibby et al. ................. | 714/764 |
| 4,139,148 A | * | 2/1979 | Scheuneman et al. ...... | 714/753 |
| 4,255,808 A | * | 3/1981 | Schaber ....................... | 714/764 |
| 4,317,201 A | * | 2/1982 | Sedalis ........................ | 714/766 |
| 4,369,510 A | * | 1/1983 | Johnson et al. .............. | 714/49 |
| 4,375,664 A | * | 3/1983 | Kim ............................ | 714/52 |
| 4,456,993 A | * | 6/1984 | Taniguchi et al. ............ | 714/6 |
| 4,535,455 A | * | 8/1985 | Peterson ....................... | 714/6 |
| 4,617,660 A | * | 10/1986 | Sakamoto ...................... | 714/6 |
| 4,617,664 A | * | 10/1986 | Aichelmann et al. ........ | 714/758 |
| 4,884,271 A | * | 11/1989 | Concha et al. ............... | 714/764 |
| 5,172,379 A | * | 12/1992 | Burrer et al. ................. | 714/767 |
| 5,199,033 A | * | 3/1993 | McGeoch et al. ............ | 714/7 |
| 5,206,865 A | * | 4/1993 | Gruender et al. ............ | 714/767 |
| 5,233,616 A | * | 8/1993 | Callander .................... | 714/758 |
| 5,263,032 A | * | 11/1993 | Porter et al. ................. | 714/764 |
| 5,369,650 A | * | 11/1994 | Kirk et al. ................... | 714/765 |
| 5,450,423 A | * | 9/1995 | Iwasaki et al. .............. | 714/767 |
| 5,481,552 A | * | 1/1996 | Aldereguia et al. ......... | 714/773 |
| 5,701,313 A | * | 12/1997 | Purdham ..................... | 714/764 |
| 5,809,228 A | * | 9/1998 | Langendorf et al. .......... | 714/53 |
| 5,922,080 A | | 7/1999 | Olarig ......................... | 714/767 |
| 5,953,258 A | | 9/1999 | Thomann ................ | 365/189.01 |
| 5,974,576 A | * | 10/1999 | Zhu ............................ | 714/704 |
| 5,978,952 A | * | 11/1999 | Hayek et al. ................ | 714/764 |
| 5,987,628 A | * | 11/1999 | Von Bokern et al. ......... | 714/48 |
| 6,038,680 A | * | 3/2000 | Olarig ............................ | 714/6 |
| 6,070,255 A | * | 5/2000 | Dell et al. ..................... | 714/48 |
| 6,081,528 A | | 6/2000 | Thomann .................... | 370/395 |
| 6,101,614 A | * | 8/2000 | Gonzales et al. .............. | 714/6 |
| 6,237,116 B1 | * | 5/2001 | Fazel et al. ................. | 714/720 |
| 6,397,365 B1 | * | 5/2002 | Brewer et al. ............. | 714/766 |
| 6,460,157 B1 | * | 10/2002 | Chen et al. ................. | 714/758 |

* cited by examiner

*Primary Examiner*—Stephen M. Baker
(74) *Attorney, Agent, or Firm*—Amin & Turocy LLP; R. Scott Speroff; Alexander M. Gerasimow

(57) ABSTRACT

A system for providing error check and correction (ECC) is provided. The system includes an ECC interface for storing ECC codes in a first memory system and storing data in a second memory system. The ECC interface corrects errors in the data received from the second memory system utilizing the ECC codes received from the first memory system. The ECC interface asserts at least one error flag upon detecting errors in the data, and a processor monitors the at least one error flag and corrects the data stored in the first memory system.

18 Claims, 6 Drawing Sheets

SYSTEM AND METHOD FOR PROVIDING ERROR CHECK AND CORRECTION IN MEMORY SYSTEMS

FIELD OF THE INVENTION

The present invention relates generally to an error check and correction (ECC) system and method for memory systems associated with industrial controller applications. In particular, the present invention provides ECC in conjunction with standard memory devices which do not normally support ECC.

BACKGROUND OF THE INVENTION

Memory integrity is a critical factor that distinguishes industrial control systems from general purpose computer systems. Memory errors, which affect memory integrity, are a significant concern in control system applications because they may affect an operation being controlled. For example, control programs and input/output (I/O) decisions are typically stored in RAM and precisely direct physical operations of the system. If an input bit were to suddenly change due to a memory error, the control program may react to the changed input by turning on or off a key output in response thereto. Depending on the nature of the output change, undesirable consequences may occur. Likewise, if a control program bit were to change unpredictably, the industrial controller may execute a random and/or unpredictable control sequence—this again may lead to undesirable control results. Thus, for robust control systems design, memory error detecting systems are generally necessary to ensure memory integrity.

In general, industrial controllers (e.g., Programmable Logic Controllers (PLCs), and Small Logic Controllers (SLCs)) provide parity and/or error check and correcting ECC systems to help ensure reliability of memory systems which control industrial processes. Parity bits allow for error detection of inadvertent changes in one or more bits of stored data. Parity may be provided as an extra bit of storage per byte of data written to memory, for example. Thus, for a controller employing eight-bit memory devices, nine bits of storage are required for each memory address.

In an ECC based system, codes (e.g., multiple bits) are computed and stored in conjunction with desired data. If an error is detected when memory is read, correcting algorithms are applied to the faulty data in conjunction with stored ECC codes, and in some cases, data may be restored. On such class of ECC correcting algorithms include utilization of "Hamming Codes" which are employed to detect and correct errors that may have occurred.

Traditionally, static random access memory (SRAM) systems have been employed by industrial controllers due in part to ease of parity implementation, and that 9 and 18 bit devices were readily available. Industrial controllers, however, would benefit greatly if commercial memory devices could be utilized such as for example synchronous dynamic random access memory (SDRAM) devices. This benefit is due in part to higher densities and lower costs than associated with conventional SRAM systems. Unfortunately, SDRAMs do not support parity due to cost pressures related to commercial PC markets. Additionally, SDRAMs do not readily support FCC due to the synchronous nature of the devices. In particular, synchronous memory devices which have been started on a sequential stream of accesses, do not lend themselves to stopping and correcting errors on the fly.

Consequently, there is a strong need in the art for a system and/or method for employing SDRAM technology in conjunction with industrial control systems. Moreover, there is a strong need for an ECC system which operates with SDRAMs and/or other memory systems to alleviate the aforementioned problems associated with conventional systems and/or methods.

SUMMARY OF THE INVENTION

The present invention provides a system and method for applying ECC to SDRAM and/or other memory systems employed in industrial control applications. An ECC interface system provides memory integrity by detecting and alerting an external processor of errors associated with a commercially available SDRAM system while seamlessly enabling the processor to communicate and correct the errors. The unique architecture of the present invention utilizes the ECC interface in conjunction with a methodology for error correction to provide a low cost and high performance memory system as compared to conventional ECC systems.

In particular, the ECC interface of the present invention, when data is written to an SDRAM array configured for a 32 bit data bus for example, interfaces to at least one additional SDRAM to store ECC codes. The ECC codes (7 bits) are generated on writes for 32 bits of data to the memory array. The ECC codes are checked on reads by the ECC interface, and single bit errors are corrected as they are read from the memory array before being communicated to the processor. However, single bit errors are not corrected immediately within the SDRAM memory array when initially corrected and communicated to the processing system. Instead, a single bit error flag is provided to the processor and a faulty data address is captured or latched. Additionally, if earlier errors have been detected, a second status bit may be set indicating multiple locations in the memory array containing errors. If multiple bit errors occur, which are not correctable within a single address location, a third status bit which may be configured to initiate an immediate shut down of the industrial control system.

A routine initiated by the processor is employed to periodically test the status of the single bit error flag. If a single bit error is detected, data is read from the latched error address and corrected data is re-written by the processor during background operations. The processor may then re-read the location to determine whether or not the problem was a hard (e.g., stuck bit) or soft (e.g., noise induced) error. If the error persists after the re-write, a hard error may be determined, otherwise, a soft error may be logged.

The present invention also provides a read-modify-write (RMW) operation for detecting byte (8 bits) or word (16 bits) writes and updating the SDRAM accordingly. This is accomplished by reading 32 bits from the SDRAM array, modifying the 32 bits with byte or word data intended for the SDRAM array, and re-writing the modified 32 bits back to memory with a new ECC code for the modified data.

The combined methodology and system approach as described above provides many benefits over conventional systems. For example, single bit errors are corrected by the ECC interface when read from the memory array by the processor. Overall system performance is increased since the processor is not required to wait while actual memory locations are corrected since memory locations are corrected at a later time—during lower priority operations of the processing system. Secondly, the need for complex external memory correction circuits is mitigated by capturing faulty memory addresses and allowing the processor to correct the faulty memory location. Additionally, processor monitoring of error status bits enables the system to determine hard versus soft errors during the correction process and to determine, if so desired, an error rate for a particular memory array. If multiple bit errors are detected as described above, a fatal flag may be set and the system may be safely shutdown if desired.

In accordance with an aspect of the present invention, an error check and correction (ECC) system is provided. An ECC interface stores ECC codes in a first memory system and stores data in a second memory system. The ECC interface corrects errors in the data received from the second memory system utilizing the ECC codes received from the first memory system. The ECC interface asserts at least one error flag upon detecting errors in the data. A processor monitors the error flag and corrects the data stored in the second memory system.

In accordance with another aspect of the present invention, an error check and correction (ECC) system employing standard synchronous dynamic random access memory SDRAM is provided. The system includes a means for storing ECC codes in a first SDRAM and a means for storing data in a second SDRAM. The system also includes a means for correcting errors in the data received from the second SDRAM utilizing the ECC codes received from the first SDRAM. The system provides a means for asserting at least one error flag upon detecting errors in the data and means for monitoring the error flag and correcting the data stored in the second SDRAM.

In accordance with yet another aspect of the present invention, a methodology for error check and correction (ECC) is provided. The methodology includes the steps of storing ECC codes in a first synchronous dynamic random access memory (SDRAM); storing data in a second SDRAM; correcting errors in the data received from the second SDRAM utilizing the ECC codes received from the first SDRAM; asserting at least one error flag upon detecting errors in the data; and monitoring the error flag and correcting the data stored in the second SDRAM.

In accordance with still yet another aspect of the present invention, an industrial controller is provided. The industrial controller provides an ECC interface for storing ECC codes in at least one synchronous dynamic random access memory (SDRAM) system and storing data in at least one other SDRAM system. The ECC interface corrects errors in the data received from the at least one other SDRAM system utilizing the ECC codes received from the at least one SDRAM system. The ECC interface asserts at least one error flag upon detecting errors in the data. A processor monitors the error flag and corrects the data stored in the at least one other SDRAM system.

In accordance with still further yet another aspect of the present invention, an error check and correction (ECC) system in an industrial controller is provided. The system includes an ECC interface for storing ECC codes in a first synchronous dynamic random access memory (SDRAM) system and storing data in a second SDRAM system. The ECC interface corrects errors in the data received from the second SDRAM system utilizing the ECC codes received from the first SDRAM system. The ECC interface asserts a first error flag upon detecting errors in the data, and the ECC interface asserts a second error flag upon detecting errors associated with multiple memory locations. The ECC interface asserts a third error flag upon detecting a multiple bit error. A processor monitors the first error flag and corrects the data stored in the second SDRAM system, and the processor faults the industrial controller if the third error flag is asserted.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
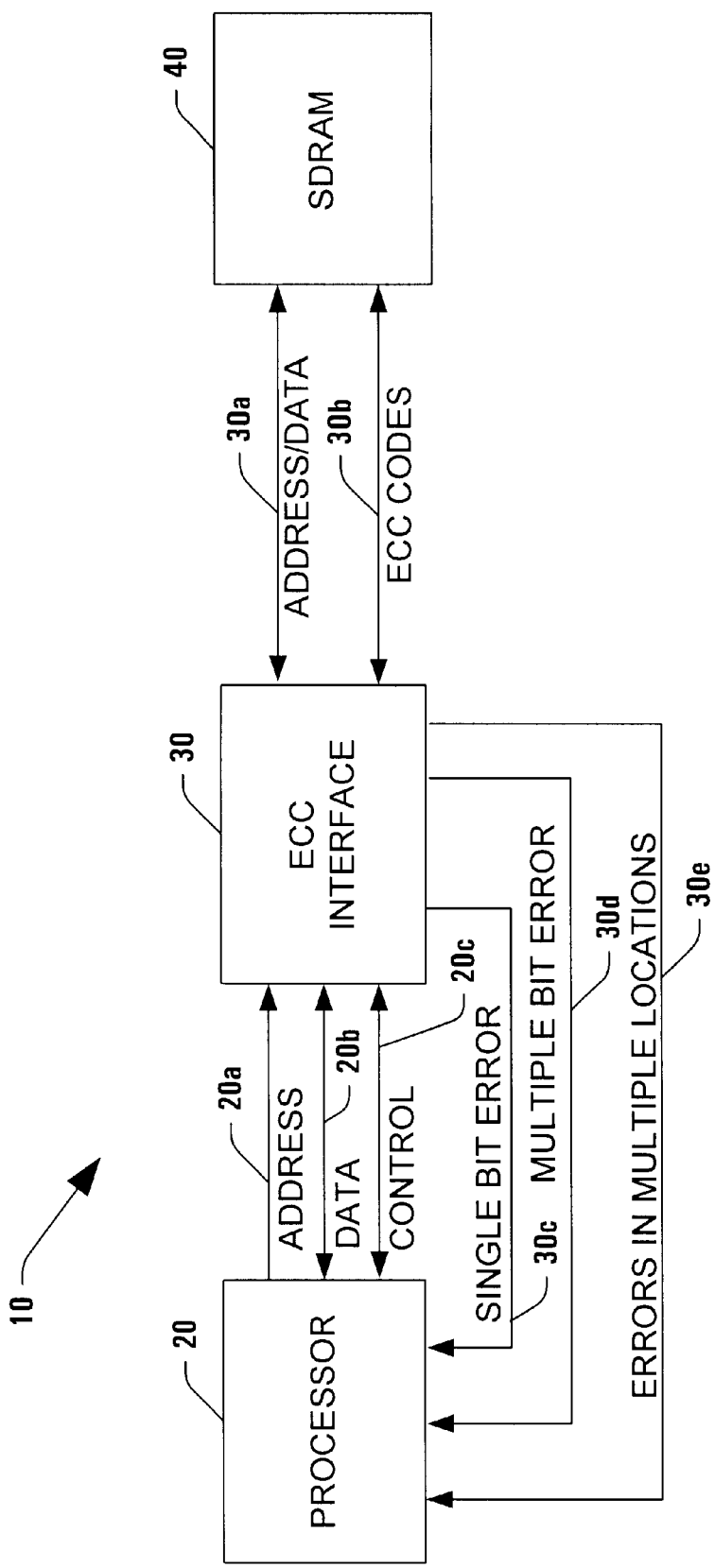
FIG. 1 is a schematic block diagram of a processor and ECC interface communicating with a memory system in accordance with the present invention.

The present invention will now be described with reference to the drawings, wherein like reference numerals are used to refer to like elements throughout.

Referring initially to FIG. 1, a schematic block diagram of an ECC/SDRAM system 10 is illustrated in accordance with the present invention. The system 10 includes a processor 20, an ECC interface 30 and an SDRAM system 40. A seamless interface is provided between the SDRAM system 40 and the processor 20 during both reads and writes by the ECC interface 30. If memory reads are detected, previously stored ECC codes and data are retrieved and utilized to correct memory errors that may have occurred. If memory writes are detected, ECC codes are written to the SDRAM system 40 along with desired data. As will be described in more detail below, if errors are detected, error flags 30c, 30d and/or 30e may be set to alert the processor 20 that the SDRAM system 40 is to be corrected. It is to be appreciated that the SDRAM system 40 may include an SDRAM array and/or a plurality of SDRAM devices. Preferably, at least one SDRAM device within the SDRAM system 40 is employed for storing a separate ECC code per 32 bits of data stored. It is further to be appreciated that memory systems other than SDRAM technology may be employed to carry out the present invention.

The ECC interface 30 monitors and controls the processor's 20 access (e.g., address, data, control) to the SDRAM system 40. The ECC interface 30 determines and stores ECC codes 30b when the processor 20 writes to the SDRAM system 40. When the processor 20 reads from the SDRAM system 40, the ECC interface 30 calculates an ECC code and compares the calculated ECC code with previously stored ECC codes 30b. If the two codes are not the same, one or more error flags 30c, 30d and/or 30e may be asserted to alert the processor 20 that a potential memory failure exists. If a single bit (no greater than one bit from any given memory address) error is detected, a corrected version of data 20b is then provided to the processor 20, and a faulty SDRAM address 20a is latched by the ECC interface 30. Upon detecting the error flag 30c (e.g., single bit error) has been asserted, the processor 20 attempts to correct the error during background operations as will be described in more detail below. If the error flag 30d indicates that a multi-bit error has been detected, the processor 20 may initiate system 10 shutdown procedures. A third flag, 30e may be set to indicate that single bit errors have occurred in more than one address location.

The processor 20, may be any suitable microprocessor, computer, processing system, or state machine for operating an industrial controller. The processor 20 is preferably configured to monitor error flags, and take corrective action as described in more detail below. It is noted that errors are not corrected immediately in the SDRAM system 40 but are initiated at a later time by the processor 20. In this manner, errors are corrected in real-time, and the processor 20 is not required to wait while the SDRAM system 40 itself is corrected. Thus, high performance of the system 10 is facilitated by allowing the SDRAM system 40 to be corrected during lower priority operations of the processor 20. Additionally, since errors may be monitored by the processor 20, statistical error analysis may be performed concerning error rates for example. Thus, an operator can be informed if a particular system exhibits a particularly high rate of memory faults. Based on such information, an operator may choose to troubleshoot and correct potential noise sources in the system 10.

As the processor 20 writes data to the SDRAM system 40, the ECC interface 30 determines and communicates an ECC code (e.g., 7 bit Hamming code) to the SDRAM system 40 per every 32 bits of data written to memory. The control bus 20b is also monitored to determine if less than 32 bits are written by the processor 20. If less than 32 bits (e.g., 8 bits, 16 bits) are written, a read-modify-write (RMW) operation is performed by the ECC interface 30 as similarly described in U.S. Pat. No. 5,914,970 entitled "Computer Memory System Providing Parity with Standard Non-Parity Devices", which is hereby incorporated by reference in its entirety.

In general, during a sub-32 (less than 32) bit write, the ECC interface 30 sends a Wait signal (see 20c3 in FIG. 2) to the processor 20 over control bus 20c. A full 32 bits are then read and corrected from the SDRAM system 40 at the address specified for the sub-32 bit write. The ECC interface 30 then multiplexes (modifies) a byte or word from the processor 20 with the 32 bits read from the SDRAM system 40. The modified 32 bits are then written back to the SDRAM system 40 with an updated ECC code at which time the Wait signal 20c3 is released and thereby enabling the processor 20 to continue.

As the processor 20 reads data from the SDRAM system 40, the ECC interface 30 determines an ECC code, provides corrected data if necessary to the processor 20, and compares the determined ECC code with a received ECC code from bus 30b for a given address. If the stored ECC code does not match the determined ECC code, at least one or more error flags 30c, 30d and 30e are set to signal the processor 20 that an error has occurred. The error flag 30c may be set to indicate an error has occurred at a given memory location. The error flag 30d indicates whether a non-correctable multi-bit error has occurred, and the error flag 30e may be set when more than one error has occurred before the processor 20 has corrected a previous error. The address of the faulty memory location is also latched by the ECC interface 30 to point to the most recent faulty memory location.

The processor 20, upon detecting that a single bit error 30c has occurred may attempt to write corrected data to the faulty memory location as indicated by the latched address. Preferably, the processor 20 is configured to re-check (read) the faulted address to determine if a hard error has occurred. For example, a hard error may be determined if an address fails more than a predetermined number of times. If a hard single bit error is determined, the processor 20 may alert an operator that module replacement is recommended even though the ECC interface 30 may allow system operation to continue with a faulty memory system. Likewise if a soft error (e.g., one time fault) is determined, the processor 20 may be configured to alert and provide statistical information concerning the number of soft errors and the rate at which the errors occur (e.g., 3 soft errors/day). The single bit error may be reset when the processor first writes the corrected data from the faulty memory location and then reads the same location without error. Alternatively, errors flags may be reset from an external signal (not shown) sent by the processor 20 to the ECC interface 30.

As described above, the processor 20 is configured to monitor the error flags and to correct single bit errors at a later time if necessary. The ECC interface 30 may also provide the error flag 30d indicating a multi-bit error which is uncorrectable. In this case, the multi-bit error flag 30d may be set by the ECC interface 30, and the processor 20 may be configured to initiate an immediate fault whereby an orderly shutdown routine is performed for the system 10.

When single bit errors have occurred in more than one memory location, a flag 30e may be set. In this case, the memory error from the most recent address is latched and reflects the most recent memory location wherein an error has occurred. The prior memory error may then be corrected on the next occasion that memory is read from and wherein the single bit error flag was initially set. If the flag 30e is set, the processor 20 may be configured to check the ECC flags more often such that errors are corrected before an error may occur in a subsequent memory location. The error flag checking time may be an operator/processor configurable parameter and may be adjusted to cause the processor 20 to check the error flags at a higher or lower rate. For example, in a high noise environment, whereby errors are more likely to occur, the error flag checking time may be decreased to cause error flag checking at a higher rate.

Figure 2:
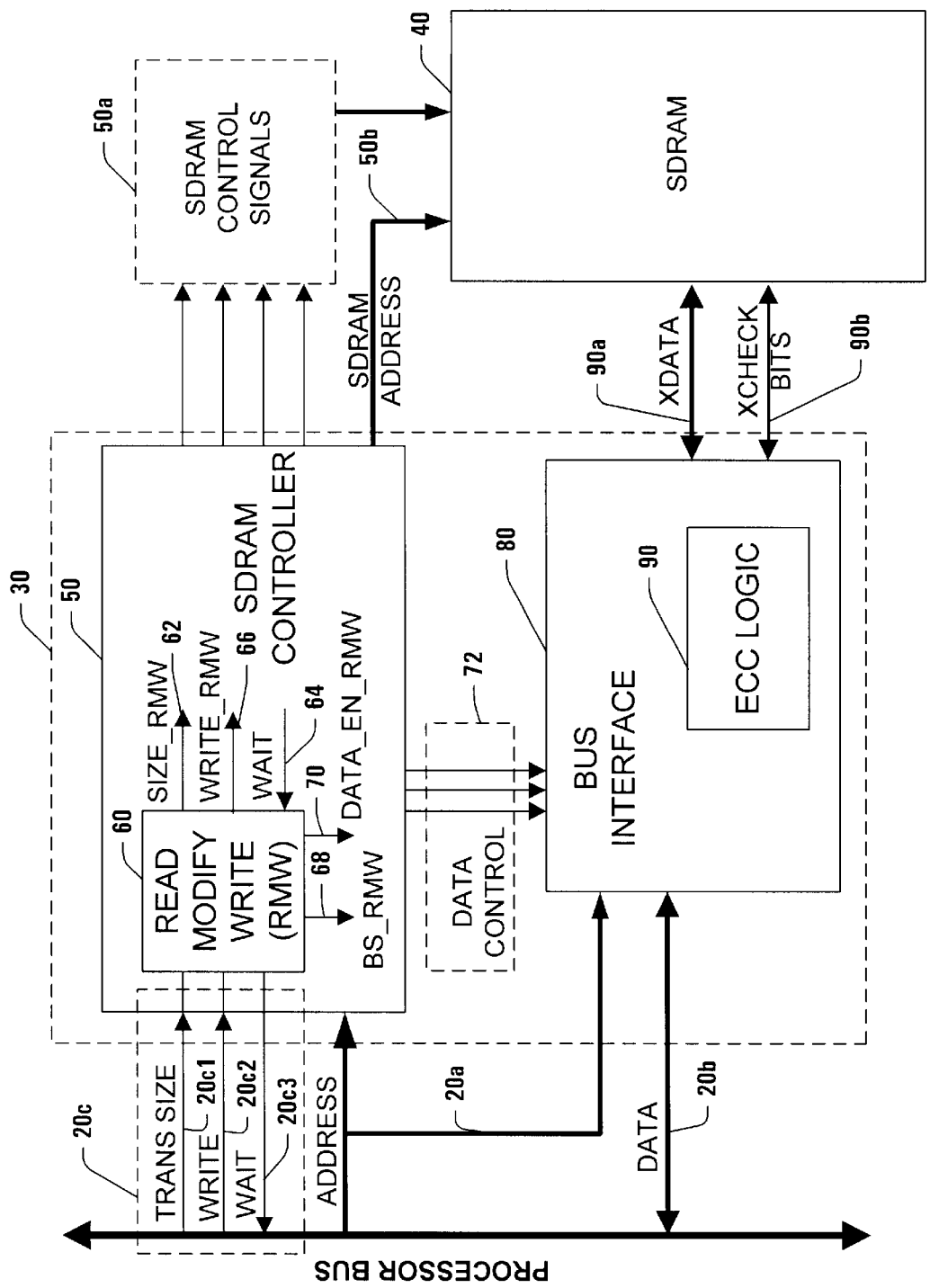
FIG. 2 is a detailed schematic block diagram of an ECC interface in accordance with the present invention.

Now turning to FIG. 2, a more detailed schematic diagram of the ECC interface 30 is shown illustrating the control interface between the processor bus 20a, 20b and 20c and the SDRAM system 40 in accordance with the present invention. The ECC interface 30 includes an SDRAM controller 50, a bus interface 80 and ECC logic 90. The SDRAM controller 50 generates SDRAM control signals 50a and SDRAM address 50b from the processor memory address bus 20a and control bus 20b as is well understood in the art. The control signals 50a may include chip selects along with row and column address strobes for example to strobe data into and out of the SDRAM system 40.

The SDRAM controller 50 includes a Read-Modify-Write (RMW) circuit 60 as described above for interfacing to the processor control bus 20c and controlling operations of the SDRAM system 40 when less than 32 bits of data are written by the processor 20. A Transfer Size signal 20c1 and Write signal 20c2 are monitored by the RMW circuit 60 to determine if less than 32 bits (sub-32 bit) are to be written to the SDRAM system 40. If a sub-32 bit write is detected, the RMW circuit 60 modifies a Size_RMW signal 62 and Write_RMW signal 66 to force a 32 bit read to the SDRAM 40. Upon detecting the RMW operation, the SDRAM controller 50 asserts a wait signal 64 to the RMW circuit 60 which is communicated to the processor 20 as Wait 20c3. The processor 20 is then held in an idle state until Wait 20c3 is released at the end of the RMW operation.

The bus interface 80 directs data associated with data bus 20b to and from the SDRAM system 40 and through the ECC logic 90. A data control bus 72 is received from the SDRAM controller 50 by the bus interface 80 to control data flow through the ECC logic 90 during read and write operations and to control RMW operations. The data control bus 72 includes signals Write_RMW 66, ByteSelect_RMW 68, and DataEnable_RMW 70 which controls and directs data flow through the ECC logic 90 during RMW operations and are described in more detail below in relation to FIG. 4. The address bus 20a is received by the bus interface 80 and is clocked into registers (not shown) for timing synchronization with the ECC logic 90 and the SDRAM system 40.

During processor 20 write operations, the ECC logic 90 receives data associated with processor bus 20b and provides data 90a and ECC check bits 90b to the SDRAM system 40. During processor read operations, the ECC logic receives data 90a and previously stored ECC check bits 90b associated with the SDRAM system 40. As will be described in more detail below, The ECC logic 90 is responsible for determining check bits, correcting single bit errors, latching error addresses, and asserting single and multiple bit error flags when appropriate. It is further noted that the ECC logic 90 detects errors per 32 bits of data in conjunction with 7 check bits associated therewith.

Figure 3:
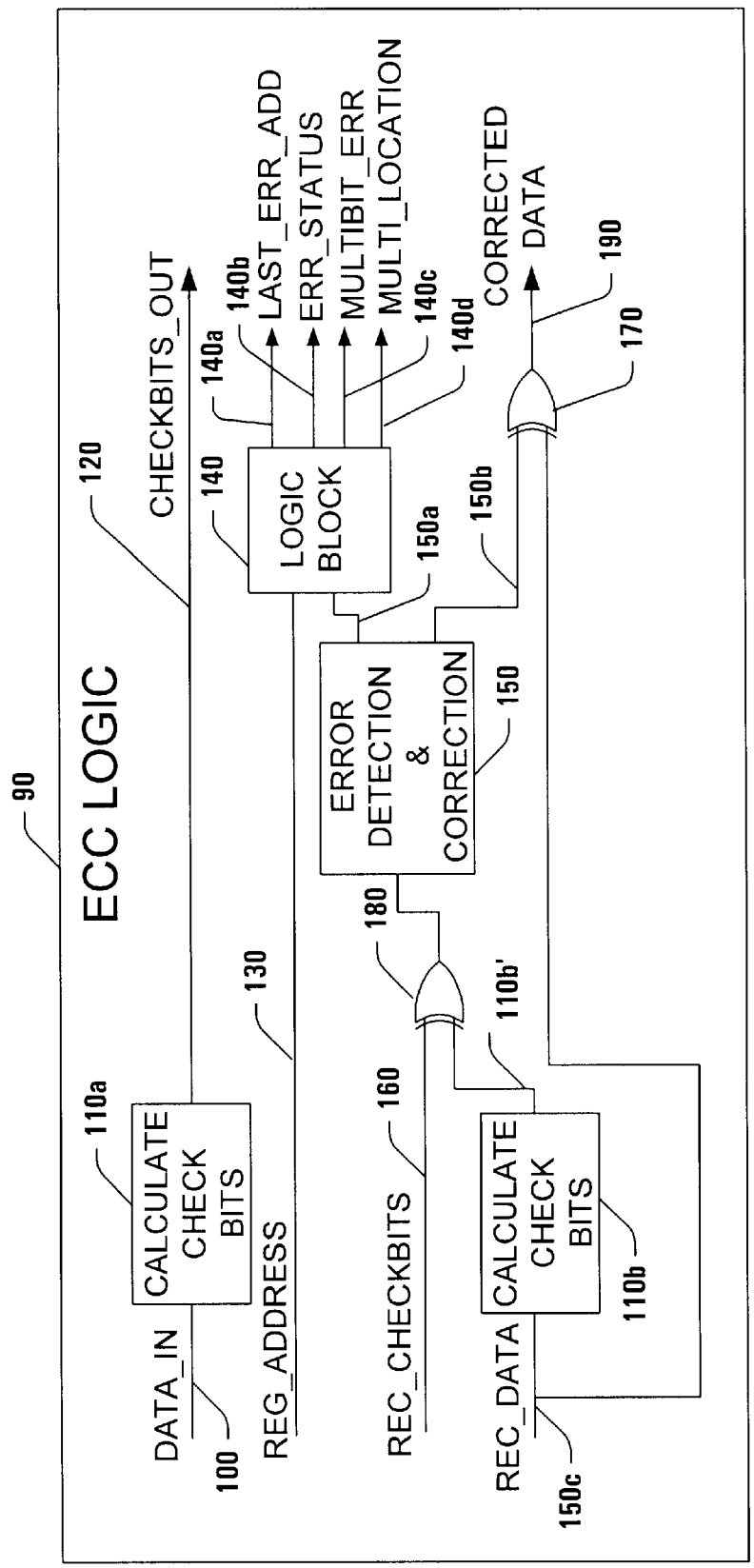
FIG. 3 is a schematic block diagram of an ECC logic block in accordance with the present invention.

Referring now to FIG. 3, a schematic block diagram of the ECC logic 90 is shown. Data which is to be written to the SDRAM system 40 is represented as Transmit Data 100 and is provided to a check bit generator 110a. The check bit generator 110a determines appropriate ECC codes for the Transmit Data 100 and provides ECC check bits 120. Preferably, a hamming code is employed to provide the ECC check bits 120. A registered memory address 130 is provided by the bus interface 80 as described above in order that if an error is detected, the address of the error may be latched. The latched memory address may then be employed by the processor 20 to correct the actual data in the SDRAM system 40.

During a memory read, the registered memory address 130 is received as an input to a logic block 140. If an error is detected by an error detection and correction (EDC) block 150, an error output 150a is provided as a trigger signal input from the EDC block to cause a latch of the registered memory address 130. The latched error address is provided as output 140a and may be read by the processor 20 when determining if memory errors have occurred. If a single error is pending, an error status bit 140b (shown as 30c in FIG. 1) is set by the logic block 140 when the trigger input 150a is asserted. If a second error is detected, before the first error is corrected, an "errors in multiple location" flag 140d (shown as 30e in FIG. 1) may be asserted. A standard counter (not shown) may be configured by the logic block 140, for example, to set the "errors in multiple location" flag 140d if more than one error is present. The counter may be reset when the error status bit is reset. Alternatively, the error status bit may be directed to a latch input (not shown). If an error occurred before the error status bit was cleared, the latch would clock the error status bit to the "errors in multiple location" output 140d. As described above, if more than one data bit error is present in any given address location, the EDC block 150 may direct the logic block 140 to assert the multi-bit error flag 140c.

As the SDRAM system 40 is read via the bus interface 80, received data 150c and received check bits 160 are directed to the ECC logic 90. The received data 150c is provided as input to a check bit generator 110b and to a corrective exclusive OR function block 170. As described above in regard to check bit, generator 110a, the check bit generator 110b determines ECC check bits from the received data 150c from the SDRAM system 40. The check bit generator 110b output is provided as input 110b' to an error detecting exclusive OR function block 180. If differences are detected between the received check bits 160 and the calculated check bits 110b', the error detecting exclusive OR function block 180 provides an error transition signal 180' to the EDC 150. The EDC block upon detecting the error transition 180', then determines corrected output data 150b. The corrective output data 150b is combined with the received data 150 by the corrective exclusive OR function block 170 which provides corrected data output 190 to the processor 20.

It is to be appreciated that the functional blocks described above for the bus interface, ECC logic, error flags and RMW operations may alternatively be implemented all or in part by the processor 20. For example, the processor 20 may store ECC codes in an internal processor memory each time data is written to the SDRAM system 40. The processor determined ECC codes could then be stored in the internal memory in a relative position to the data stored in the SDRAM system 40. For example, data stored at SDRAM address 0 would have a related ECC code stored in the first position of the internal memory of the processor 20. When data is read from the SDRAM system 40, the processor 20 would then determine if errors were present by comparing the stored ECC codes with the actual received data. If an error were detected, the processor 20 may be configured to write corrected ECC data back to the failed memory location. Error bits may also be asserted by the processor 20 to alert an operator of single and double bit errors and to provide statistical information related to frequency of errors and/or type of errors (e.g., hard/soft).

Figure 4:
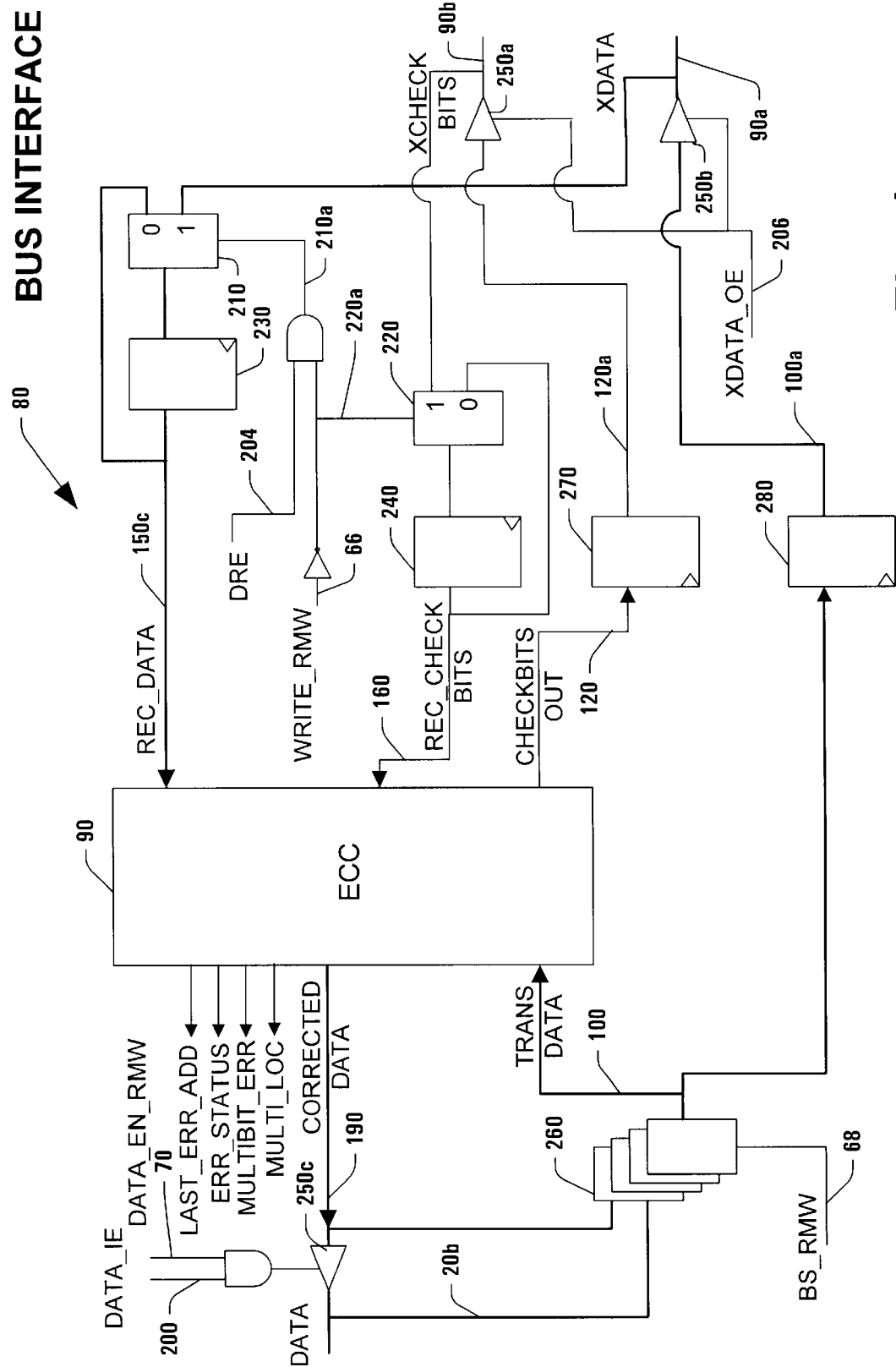
FIG. 4 is a schematic diagram of a bus interface in accordance with the present invention.

Turning now to FIG. 4, a more detailed schematic block diagram illustrates the interaction of the bus interface 80 and the ECC logic 90 depicted in FIG. 3. To better understand workings of the bus interface 80, bus operations will be described in accordance with 32 bite read, 32 bit write and a sub-32 bit RMW operation. As described above, control signals, Write_RMW 66, ByteSelect_RMW 68 and DataEnable_RMW 70 are employed to control data flow through the ECC logic 90 and between the processor 20 and the SDRAM system 40. Additionally, control signals Data_IE 200 (data input enable), DRE 204 (data refresh enable) and Xdata_OE 206 are employed to direct and control data flow. The DRE signal 204 is provided to disable RMW operations if so desired. For example, the bus interface 80 may be employed in a system that is limited only to 32 bit reads and writes. For purposes of the following discussion, DRE 204 is assumed to be active (high/RMW enabled) and further discussion related thereto is omitted for the sake of brevity.

In accordance with a processor read operation, Write_RMW 66 (WRMW) is asserted low to direct multiplexors 210 and 220. When multiplexor control inputs 210a and 220a are high, data and check bits 90a and 90b may be directed to the ECC logic 90. The data is directed, through register paths 230 and 240 which output the receive data 150c and receive check bits 160 to the ECC logic 90. As will be described in more detail below, registered paths 230 and 240 are required for RMW operations. During read operations, Xdata_OE 206 is asserted low such that buffers 250a and 250b are disabled in order that output data bus 100a and output check bit bus 120a do not conflict with incoming data 90a and check bits 90b from the SDRAM system 40. In order for the processor 20 to read actual SDRAM data 90a on data bus 20b, both Data_IE 200 and DataEnable_RMW 70 are asserted high such that buffer 250c is enabled.

In accordance with a processor 32-bit write operation, data bus 20b is directed through a four byte multiplexor 260. Each byte of the multiplexor 260 may direct a data byte from either corrected data bus 190 or the data from bus 20b, and ByteSelect_RMW 68 (BS) is employed to select bytes from either bus. ByteSelect_RMW 68 is preferably a four signal set for individually selecting bytes from any portion of buses 20b or from corrected data 190. For example, if all BS 68 signals are low, all four bytes from bus 20b are directed to the ECC logic 90 and SDRAM system 40. If two of four BS 68 signals are low, two bytes are selected from bus 20b and two bytes are selected from bus 190. The byte selection function of the present invention is described in more detail below in accordance with RMW operations.

During 32 bit processor write operations, BS 68 directs data bus 20b to the ECC logic and the SDRAM system 40. Registered data paths 270 and 280 provide timing synchronization between check bits 120 and data 100 such that both may concurrently arrive and in accordance with clocked memory access of the SDRAM system 40. Xdata_OE 206 is asserted high such that buffers 250a and 250b are enabled and may direct buses 120a and 100a to the SDRAM system 40. Data_IE 200 and DataEnable_RMW 70 are asserted low during processor 20 writes in order that corrected data bus 190 does not conflict with data bus 20b.

In accordance with a less than 32 bit write operation, a RMW operation is required. At first, when less than 32 bits are required to be written, WRMW 66 is asserted low such that 32 bits of data and 7 check bits are directed from the SDRAM system 40 and clocked into the registered data paths 230 and 240 respectively via multiplexors 210 and 220. Xdata_OE is also asserted low along with Data_IE 200 and DataEnable_RMW 70 during the read portion of the RMW operation such that buffers 250a, 250b, and 250c are disabled. WRMW 66 is then asserted high during the modify portion of the RMW operation. ByteSelect_RMW 68 is then employed to select a byte or bytes from bus 20b to be written along with the data previously read from the SDRAM system 40 currently residing in the registered data paths 230 and 240. It is noted, that when WRMW 66 is high, registered data paths 230 and 240 are looped back via multiplexors 210 and 220 in order to maintain the SDRAM data previously read. As data is written to the SDRAM system 40 during the write portion of the RMW operations, new check bits 120 are determined and stored along with the multiplexed data. The multiplexed data is the combination of desired data bytes to be written from data bus 20b and previously read data from corrected output 190 which is supplied from the registered data paths 230 and 240. During the write portion of the RMW, Xdata_OE is asserted high to enable buffers 250a and 250b.

Figure 5:
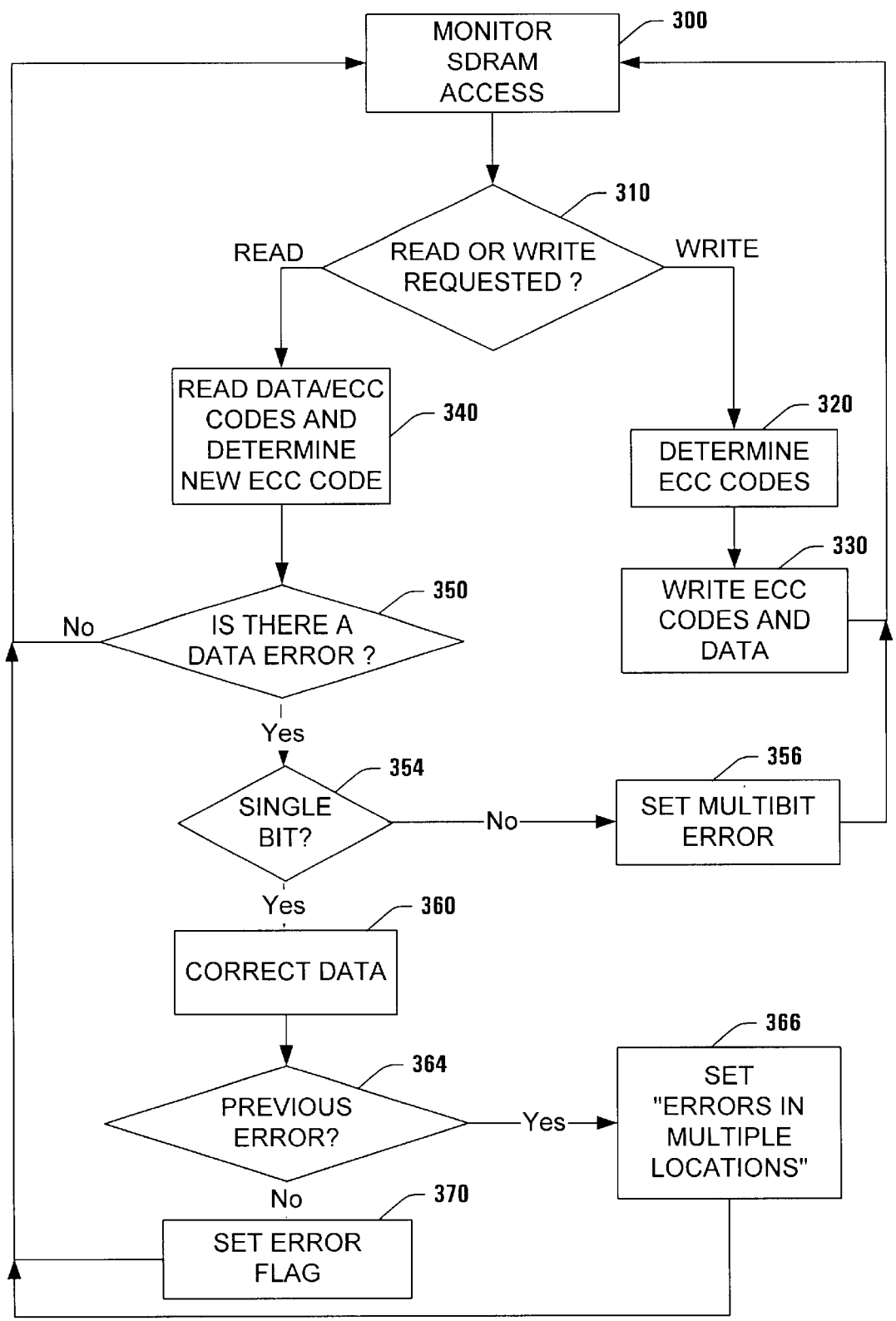
FIG. 5 is flow diagram of a methodology for storing and retrieving ECC codes and reporting memory errors in accordance with the present invention.

Now referring to FIG. 5, a flow diagram illustrates a method in accordance with the present invention. At step 300, processor access is monitored (e.g., address and control bus) to determine whether data reads or writes are directed to the SDRAM system 40. If a processor write is requested, the process proceeds to step 320. If processor reads are determined, the processor proceeds to step 340.

At step 320, after a processor write access has been determined, 7 bit ECC codes are determined as described above from the desired data to be written by the processor 20. At step 330, the determined ECC codes along with the corresponding data are written to the SDRAM system 40. If a processor read has been determined as described in step 310 above, the process proceeds to step 340.

At step 340, SDRAM data and previously stored ECC codes are read. Additionally, while the SDRAM is read, an ECC code is determined from the retrieved data. At step 350, the determined ECC code is compared to the previously stored ECC code. If no differences exist between the codes, the process proceeds back to step 300 to monitor system access of the SDRAM system 40.

If differences between the previously stored ECC code and the determined ECC code exist, the process proceeds to step 354. At step 354, a determination is made as to whether a single or multiple bit error has been detected. If a multiple bit error is detected, the process proceeds to step 356, sets a multi-bit error flag, and then proceeds back to step 300. If a single bit error is detected at step 354, the process proceeds to step 360.

At step 360, single bit errors are corrected and provided to the processor by utilizing previously stored ECC codes as described above. At step 364, a determination is made as to whether a previous error has occurred in a prior memory location. If a previous error has occurred, the process sets an "errors in multiple location" flag at step 366 and then proceeds back to step 300. If a previous error has not occurred at step 364, the process proceeds to step 370. At step 370, a single bit error flag is set to indicate that a memory error has occurred and the SDRAM system 40 is to be corrected. After setting the error flag at step 370, the process proceeds back to step 300 to monitor SDRAM access.

Figure 6:
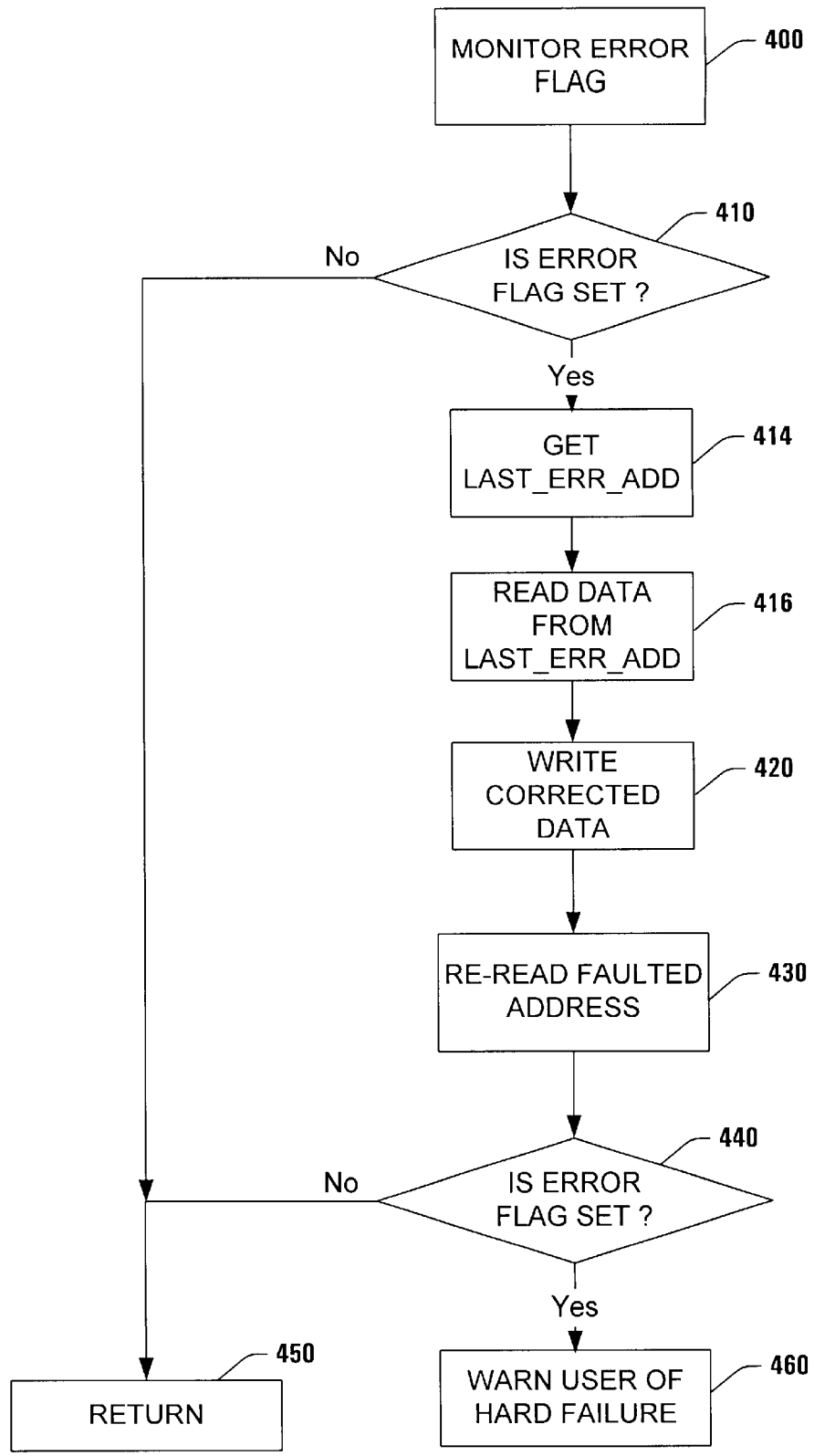
FIG. 6 is a flow diagram of a methodology for correcting memory errors in accordance with the present invention.

Now referring to FIG. 6, a flow diagram illustrates a background memory correction process in accordance with the present invention. As described above, in relation to FIG. 5, if an SDRAM error is detected, an error flag is set. Although the processor 20 is provided with corrected SDRAM data when a memory error is detected, the SDRAM is preferably corrected during background operations. In this way, system performance may be increased since the processor 20 is not required to wait while the SDRAM is actually corrected. It is to be appreciated however, that even if an SDRAM error cannot be corrected, due to a hard failure for example, the processor can continue to run so long as the errors remain single bit errors. Additionally, since the processor 20 is alerted to the memory errors, statistical analysis may be performed to determine the frequency of memory failures for example. Thus, a system may be quantitatively analyzed to alert an operator for example if the frequency of errors is above a predetermined threshold. In this way, a system may be replaced before an actual multiple bit/ uncorrectable memory failure occurs.

At step 400, the error flag identified at step 370 in FIG. 5 is monitored. If the error flag is not asserted at step 410, the process returns to real-time operations at step 450. At predetermined intervals, or upon interrupt, the process may return to step 400 to determine if memory errors have occurred.

If the error flag is set at step 410, the process proceeds to step 414. At step 414, the last error address is retrieved wherein a memory error has occurred. At step 416, data is read from the memory location pointed to by the last error address. At step 420, corrected data is re-written to the SDRAM system 40. At step 430, the SDRAM system 40 is re-read from the faulted memory address that was corrected at step 420. If the error flag is still set at step 440, the process proceeds to step 460 and may initiate a system fault. If the error flag is not set at step 440, the process proceeds to step 450 and returns to real-time operations.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for providing error check and correction (ECC), comprising:
    an ECC interface for storing ECC codes in a first memory system and storing data in a second memory system, the ECC interface corrects errors in the data received from the second memory system utilizing the ECC codes received from the first memory system, the ECC interface asserts at least one error flag upon detecting errors in the data; and
    a processor for monitoring the at least one error flag and correcting the data stored in the second memory system, the processor configured to correct the data during lower priority operations of the system.

2. The system of claim 1 further comprising an ECC logic block for latching a memory address related to the errors in the received data.

3. The system of claim 1, wherein the at least one error flag comprises a single bit error flag to alert the processor that a memory error has occurred.

4. The system of claim 1, wherein the at least one error flag comprises an "errors in multiple locations" flag to alert the processor that a plurality of memory errors has occurred.

5. The system of claim 1, wherein the at least one error flag comprises a multiple bit error flag to alert the processor that a memory system failure has occurred and further wherein the processor is configured to initiate a safe processor shut down.

6. The system of claim 1, wherein the processor determines hard errors if the occurrences of the at least one error flag are related to a particular memory address that occurs during a read, write, and re-read operation.

7. The system of claim 1, wherein the processor is configured to perform statistical analysis on the occurrences of the at least one error flag.

8. The system of claim 7, wherein the processor determines soft errors if the occurrences of the at least one error flag is below a predetermined threshold.

9. The system of claim 7, wherein the processor determines hard errors if the occurrences of the at least one error flag is above a predetermined threshold.

10. The system of claim 1, further comprising a read-modify-write block to enable the processor to write less than 32 bits to the second memory system.

11. The system of claim 10, wherein the read-modify-right block causes the processor to wait during the read-modify-write operations.

12. The system of claim 10, further comprising a bus interface for facilitating read-write-modify operations.

13. The system of claim 12, wherein the bus interface further comprises a registered data path for facilitating read-write-modify operations.

14. The system of claim 12, wherein the bus interface farther comprises a byte select multiplexor for combining byte data with the second memory system data.

15. A system for providing error check and correction (ECC) employing standard synchronous dynamic random access memory (SDRAM), comprising:
    means for storing ECC codes in a first SDRAM;
    means for storing data in a second SDRAM;
    means for correcting errors in the data received from the second SDRAM utilizing the ECC codes received from the first SDRAM;
    means for asserting at least one error flag upon detecting errors in the data; and
    means for monitoring the at least one error flag and correcting the data stored in the second SDRAM.

16. A method for providing error check and correction (ECC) comprising the steps of:
    storing ECC codes in a first synchronous dynamic random access memory SDRAM;
    storing data in a second SDRAM;
    correcting errors in the data received from the second SDRAM utilizing the ECC codes received from the first SDRAM;
    asserting at least one error flag upon detecting errors in the data; and
    monitoring the at least one error flag and correcting the data stored in the second SDRAM.

17. An industrial controller, comprising:
    an error check and correcting (ECC) interface for storing ECC codes in at least one synchronous dynamic random access memory (SDRAM) system and storing data in at least one other SDRAM system, the ECC interface corrects errors in the data received from the at least one other SDRAM system utilizing the ECC codes received from the at least one SDRAM system, the ECC interface asserts at least one error flag upon detecting errors in the data; and
    a processor for monitoring the at least one error flag and correcting the data stored in the at least one other SDRAM system.

18. A system for providing error check and correction (ECC) in an industrial controller, comprising:
    an ECC interface for storing ECC codes in a first synchronous dynamic random access memory (SDRAM) system and storing data in a second SDRAM system, the ECC interface corrects errors in the data received from the second SDRAM system utilizing the ECC codes received from the first SDRAM system, the ECC interface asserts a first error flag upon detecting errors in the data, the ECC interface asserts a second error flag upon detecting errors associated with multiple memory locations, the ECC interface asserts a third error flag upon detecting a multiple bit error; and
    a processor for monitoring the first error flag and correcting the data stored in the second SDRAM system, the processor faults the industrial controller if the third error flag is asserted.

* * * * *